(12) United States Patent
Beebe et al.

(10) Patent No.: US 11,986,975 B2
(45) Date of Patent: May 21, 2024

(54) METHODS AND APPARATUS FOR PLUGGING CELLS OF CERAMIC STRUCTURES AND HONEYCOMB FILTERS

(71) Applicant: CORNING INCORPORATED, Corning, NY (US)

(72) Inventors: Kyle Owen Beebe, Big Flats, NY (US); Robert John Locker, Corning, NY (US); Robert Arthur McIntosh, Corning, NY (US); Joel Andrew Schultes, Corning, NY (US)

(73) Assignee: Corning Incorporated, Corning, NY (US)

( * ) Notice: Subject to any disclaimer, the term of this patent is extended or adjusted under 35 U.S.C. 154(b) by 643 days.

(21) Appl. No.: 17/264,230

(22) PCT Filed: Jul. 16, 2019

(86) PCT No.: PCT/US2019/041977
§ 371 (c)(1),
(2) Date: Jan. 28, 2021

(87) PCT Pub. No.: WO2020/028035
PCT Pub. Date: Feb. 6, 2020

(65) Prior Publication Data
US 2021/0299909 A1     Sep. 30, 2021

Related U.S. Application Data

(60) Provisional application No. 62/712,587, filed on Jul. 31, 2018.

(51) Int. Cl.
*B28B 11/00* (2006.01)
*B01D 46/00* (2022.01)
(Continued)

(52) U.S. Cl.
CPC ........ *B28B 11/007* (2013.01); *B01D 46/0001* (2013.01); *B01D 46/2418* (2013.01);
(Continued)

(58) Field of Classification Search
CPC .............. B28B 11/007; B01D 46/0001; B01D 46/2418; F01N 3/0222; F01N 3/2828; B29C 70/745; B29C 70/76
(Continued)

(56) References Cited

U.S. PATENT DOCUMENTS

| 4,427,728 A | 1/1984 | Belmonte et al. |
| 4,557,962 A | 12/1985 | Belmonte et al. |

(Continued)

FOREIGN PATENT DOCUMENTS

| EP | 0070202 A1 | 1/1983 |
| EP | 2570244 A1 | 3/2013 |
| JP | S6276785 A | * 4/1987 |

OTHER PUBLICATIONS

Sugiyama et al., JPS62-76785A, Apr. 8, 1987 (Year: 1987).*
(Continued)

*Primary Examiner* — Nahida Sultana
*Assistant Examiner* — Lawrence D. Hohenbrink, Jr.
(74) *Attorney, Agent, or Firm* — Russell S. Magaziner

(57) ABSTRACT

A method for plugging a subset of cells of a honeycomb structure that includes: covering a first end face of the honeycomb structure with a mask that comprises a body and a plurality of openings, wherein the plurality of openings of the mask is coincident with a plurality of cells of the honeycomb structure; providing a plenum, a movable plunger and a flow plate; positioning a cylinder between the honeycomb structure and the plenum; dispensing a plugging material into the plenum; moving the plunger toward the flow plate with a force to push the plugging material through (Continued)

the flow plate into the cylinder, the moving generating a pressure in the plenum and the cylinder that forces the plugging material through the mask into the plurality of cells of the honeycomb structure to a predetermined depth; and determining the pressure within the cylinder during the moving of the plunger.

23 Claims, 7 Drawing Sheets

(51) Int. Cl.
*B01D 46/24* (2006.01)
*B29C 70/74* (2006.01)
*B29C 70/76* (2006.01)
*F01N 3/022* (2006.01)
*F01N 3/28* (2006.01)

(52) U.S. Cl.
CPC ............ *B29C 70/745* (2013.01); *B29C 70/76* (2013.01); *F01N 3/0222* (2013.01); *F01N 3/2828* (2013.01)

(58) Field of Classification Search
USPC ........................................................ 264/40.1
See application file for complete search history.

(56) References Cited

U.S. PATENT DOCUMENTS

| | | |
|---|---|---|
| 4,752,516 A | 6/1988 | Montierth |
| 5,021,204 A | 6/1991 | Frost et al. |
| 6,673,300 B2 | 1/2004 | Allen et al. |
| 6,699,428 B2 | 3/2004 | Nishi et al. |
| 7,537,634 B2 | 5/2009 | Hatano et al. |
| 7,611,560 B2 | 11/2009 | Ichikawa |
| 7,722,791 B2 | 5/2010 | Kimura et al. |
| 7,736,581 B2 | 6/2010 | Ito et al. |
| 7,807,085 B2 | 10/2010 | Tsuji et al. |
| 7,919,033 B2 | 4/2011 | Shoji et al. |
| 7,922,951 B2 | 4/2011 | Mudd et al. |
| 8,003,035 B2 | 8/2011 | Ito et al. |
| 8,038,817 B2 | 10/2011 | Kawai et al. |
| 9,822,681 B2 | 11/2017 | Kikuchi et al. |
| 2005/0076991 A1 | 4/2005 | Fujita |
| 2006/0131782 A1* | 6/2006 | Mudd ................ B01D 46/2418 425/129.1 |
| 2007/0114700 A1 | 5/2007 | Andrewlavage et al. |
| 2007/0220855 A1 | 9/2007 | Ichikawa |
| 2008/0128082 A1 | 6/2008 | Masuda et al. |
| 2008/0251978 A1 | 10/2008 | Ito et al. |
| 2009/0140453 A1 | 6/2009 | Hagg |
| 2013/0140736 A1 | 6/2013 | Uoe et al. |

OTHER PUBLICATIONS

International Search Report and Written Opinion of the International Searching Authority; PCT/US19/41977; dated Nov. 18, 2019; 11 Pages; European Patent Office.

* cited by examiner

METHODS AND APPARATUS FOR PLUGGING CELLS OF CERAMIC STRUCTURES AND HONEYCOMB FILTERS

This is a national stage application under 35 U.S.C. § 371 of International Application No. PCT/US2019/041977, filed on Jul. 16, 2019, which claims the benefit of priority under 35 U.S.C. § 119 of U.S. Provisional Patent Application No. 62/712,587 filed on Jul. 31, 2018, the content of which is incorporated herein by reference in its entirety.

FIELD OF THE DISCLOSURE

The present disclosure is in the field of manufacturing technical ceramic structures, and particularly relates to methods and apparatus for selectively plugging cells of ceramic structures and honeycomb filters.

BACKGROUND

Various manufacturing processes and methods of making ceramic structures and honeycomb filters employ steps and apparatus to seal selected ends and channels of these articles.

SUMMARY OF THE DISCLOSURE

According to some aspects of the present disclosure, a method for plugging a subset of cells of a honeycomb structure is provided that comprises: covering a first end face of the honeycomb structure with a mask that comprises a body having an outer edge and a plurality of openings, wherein the outer edge of the body extends outwardly of at least a portion of an outer edge of the first end face and the plurality of openings of the mask is coincident with a plurality of cells of the honeycomb structure; providing a plenum defined by an outer edge, a movable plunger and a flow plate, wherein the outer edge of the plenum extends to at least the outer edge of the first end face of the honeycomb structure and the flow plate comprises a plurality of flow holes; positioning a cylinder between the honeycomb structure and the plenum, the cylinder defined by an outer edge, the flow plate and the mask, wherein the outer edge of the cylinder extends to at least the outer edge of the first end face of the honeycomb structure; dispensing a plug of material into the plenum; moving the plunger toward the flow plate with a force to push the plug of material through the plurality of flow holes of the flow plate into the cylinder, wherein the step of moving the plunger generates a pressure in the plenum and the cylinder that forces the plug of material through the plurality of openings of the mask into the plurality of cells of the honeycomb structure to a predetermined depth within the cells; and determining the pressure within the cylinder during the step of moving the plunger.

According to some aspects of the present disclosure, a method for plugging a subset of cells of a honeycomb structure is provided that comprises: covering a first end face of the honeycomb structure with a mask that comprises a body having an outer edge and a plurality of openings, wherein the outer edge of the body extends outwardly of at least a portion of an outer edge of the first end face and the plurality of openings of the mask is coincident with a plurality of cells of the honeycomb structure; providing a plenum defined by an outer edge, a movable plunger and a flow plate, wherein the outer edge of the plenum extends to at least the outer edge of the first end face of the honeycomb structure and the flow plate comprises a plurality of flow holes; positioning a cylinder between the honeycomb structure and the plenum, the cylinder defined by an outer edge, the flow plate and the mask, wherein the outer edge of the cylinder extends to at least the outer edge of the first end face of the honeycomb structure; dispensing a plug of material into the plenum; moving the plunger toward the flow plate with a force to push the plug of material through the plurality of flow holes of the flow plate into the cylinder, wherein the step of moving the plunger generates a pressure in the plenum and the cylinder that forces the plug of material through the plurality of openings of the mask into the plurality of cells of the honeycomb structure to a predetermined depth within the cells; and determining the pressure within the cylinder during the step of moving the plunger, wherein the step of determining the pressure within the cylinder is conducted by evaluating output data from a pressure sensor film disposed between the flow plate and the mask.

According to some aspects of the present disclosure, a method for plugging a subset of cells of a honeycomb structure is provided that comprises: covering a first end face of the honeycomb structure with a mask that comprises a body having an outer edge and a plurality of openings, wherein the outer edge of the body extends outwardly of at least a portion of an outer edge of the first end face and the plurality of openings of the mask is coincident with a plurality of cells of the honeycomb structure; providing a plenum defined by an outer edge, a movable plunger and a flow plate, wherein the outer edge of the plenum extends to at least the outer edge of the first end face of the honeycomb structure and the flow plate comprises a plurality of flow holes; positioning a cylinder between the honeycomb structure and the plenum, the cylinder defined by an outer edge, the flow plate and the mask, wherein the outer edge of the cylinder extends to at least the outer edge of the first end face of the honeycomb structure; dispensing a plug of material into the plenum; moving the plunger toward the flow plate with a force to push the plug of material through the plurality of flow holes of the flow plate into the cylinder, wherein the step of moving the plunger generates a pressure in the plenum and the cylinder that forces the plug of material through the plurality of openings of the mask into the plurality of cells of the honeycomb structure to a predetermined depth within the cells; and determining a plurality of pressures within the cylinder during the step of moving the plunger, each of the pressures associated with one or more of the cells of the honeycomb structure. Further, the step of determining the plurality of pressures is conducted by evaluating output data from a pressure sensor film disposed between the flow plate and the mask. In addition, the sensor film comprises a plurality of pressure sensors.

It is to be understood that both the foregoing general description and the following detailed description describe various embodiments and are intended to provide an overview or framework to understanding the nature and character of the claimed subject matter.

The accompanying drawings are included to provide a further understanding of the various embodiments, and are incorporated into and constitute a part of this specification. The drawings illustrate the various embodiments described herein, and together with the description serve to explain the principles and operation of the claimed subject matter.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

Figure 1:
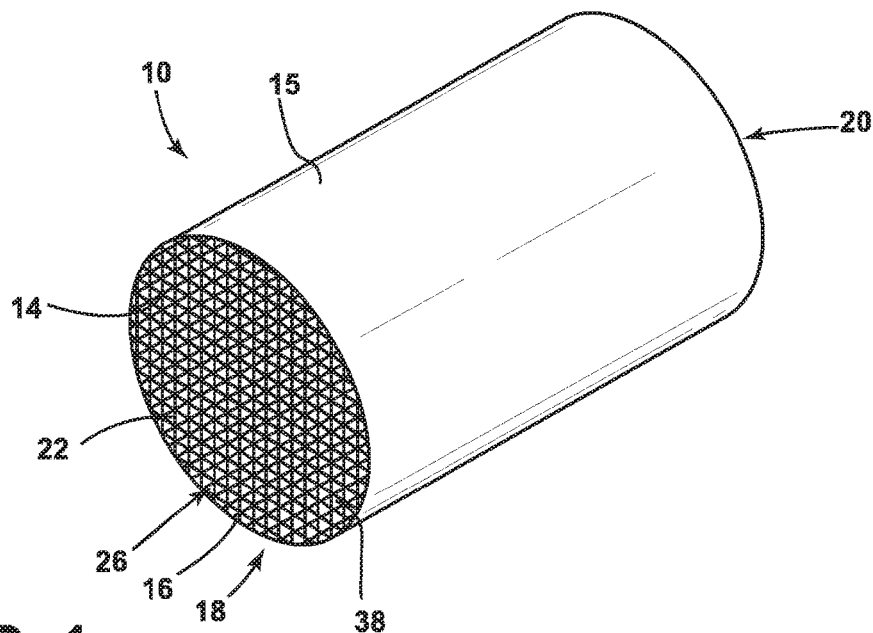
FIG. 1 is a perspective view of an extruded filter body including a first end and a second end having a plurality of open-ended cells.

The foregoing summary, as well as the following detailed description of certain inventive techniques, will be better understood when read in conjunction with the figures. It should be understood that the claims are not limited to the arrangements and instrumentality shown in the figures. Furthermore, the appearance shown in the figures is one of many ornamental appearances that can be employed to achieve the stated functions of the apparatus.

DETAILED DESCRIPTION OF THE PREFERRED EMBODIMENTS

Additional features and advantages will be set forth in the detailed description which follows and will be apparent to those skilled in the art from the description, or recognized by practicing the embodiments as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

Directional terms as used herein—for example up, down, right, left, front, back, top, bottom—are made only with reference to the figures as drawn and are not intended to imply absolute orientation.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to the drawings in general and to FIG. 1, in particular, it will be understood that the illustrations are for the purpose of describing particular embodiments and are not intended to limit the disclosure appended claims thereto. The drawings are not necessarily to scale, and certain features and certain views of the drawings may be shown exaggerated in scale or in schematic form in the interest of clarity and conciseness.

The methods and apparatus for plugging cells of ceramic structures and filters are generally applicable to the production of any of a number of complex ceramic shapes having open-ended cells, channels, tubes or comparable features. Advantageously, the methods and apparatus of the disclosure allow for the continuous monitoring of the alignment of the plugging fixtures and apparatus by measuring and evaluating plug pressure during the steps of applying plug material into these structures and filters. As the pressure data is generated and evaluated, the methods and apparatus can be employed to make adjustments (e.g., to a piston head orientation relative to a patty of the plug material) to improve the uniformity of plug length within the cells of the ceramic structures and filters. In turn, improved plug length uniformity can lead to improved part performance and higher production yields. Further, improved plug length control can lead to lower inspection costs and reduce production time.

Honeycomb structures having traverse cross-sectional cellular densities of approximately ten to one hundred cells or more per square centimeter have several uses, including solid particulate filter bodies and stationary heat exchangers. Wall flow particulate filter applications require selected cells of the structure to be sealed or plugged by a cement mixture, plug material and the like at one or both of the respective ends thereof. As used herein, the term "sealed" and other corresponding grammatical forms, i.e., sealant, sealing, etc., are used to refer to porous and non-porous methods of closing the open traverse cross-sectional areas of the cells of the ceramic structures, filters and bodies of the disclosure.

Figures 2, 2A:
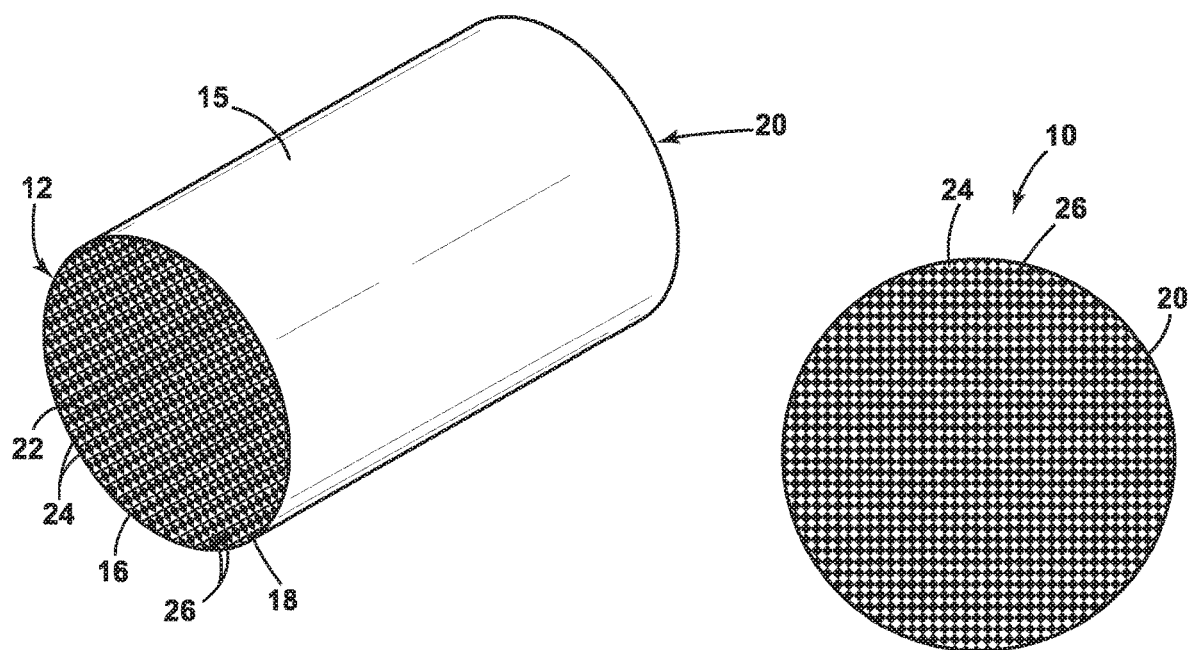
FIG. 2 is a perspective view of the first end of an extruded filter body configured comparably to the body depicted in FIG. 1, with a first subset of cells that are plugged, and a second subset of cells that are in an open-ended configuration.
FIG. 2A is a side view of the second end of the filter body of FIG. 2, with the first subset of cells that are in an open-ended configuration and the second subset of cells in a plugged configuration.

Referring now to FIG. 1, the reference numeral 10 generally designates a solid particulate ceramic filter body (also referred to herein as a "honeycomb structure"). The filter body 10 can be formed by a matrix of intersecting, thin, porous walls 14 surrounded by an outer wall 15, which in the illustrated example is provided in a circular cross-sectional configuration. The walls 14 extend across and between a first end face 18 and a plurality of cells 22. The cells 22 extend between and are open at the first end face 18 and the second end face 20, and form a large number of adjoining hollow passages in the filter body 10. The outer wall 15 defines an outer edge 16 for both the first end face 18 and the second end face 20 (see also FIG. 2). Referring to FIGS. 2 and 2A, to plug the filter body 10, one end of each of the cells 22 is sealed with a plug material. In particular, a first subset 24 of the cells 22 is sealed at the first end face 18 (see FIG. 2), and a second subset 26 of the cells 22 is sealed at the second end face 20 of the filter body 10 (see FIG. 2A). Either of the end faces 18, 20 may be used as the inlet face for the resulting filter body 10 in most configurations, e.g., when all of the cells 22 are of the same size.

In operation, contaminated fluid (e.g., particulate matter, such as exhaust soot) is brought under pressure to an inlet face (e.g., first end face 18 or second end face 20) and enters the filter 10 via those cells 22 which have an open end at the inlet face (e.g., a first subset 24 of the cells 22). Because these cells are sealed at the opposite end face, i.e., the outlet face (e.g., second end face 20 of the filter body 10), the contaminated fluid is forced through the thin porous walls 14 and into adjoining cells (e.g., a second subset 26 of the cells 22) which are sealed at the inlet face and open at the outlet face. The solid particulate contaminant in the fluid, which is too large to pass through the porous openings in the walls, is left behind and a cleansed fluid exits the filter 10 through the outlet cells, e.g., the second subset 26 of the cells 22.

Referring again to FIGS. 1, 2 and 2A, the honeycomb structures 10 for solid particulate filter bodies, and other applications, may be formed of a variety of materials comprising ceramics, glass-ceramics, glasses, metals, and by a variety of methods depending upon the material selected. Honeycomb structures, comprising the ceramic filter body 10, having the necessarily uniformed thin, porous and interconnected walls for solid particulate filtering applications are preferably fabricated from plastically formable and finely divided particles of substances that can be fired to yield a porous, sintered material. Suitable materials for the honeycomb structures and filter bodies 10 comprise metals, ceramics, glass-ceramics, and other ceramic based mixtures.

Figure 3:
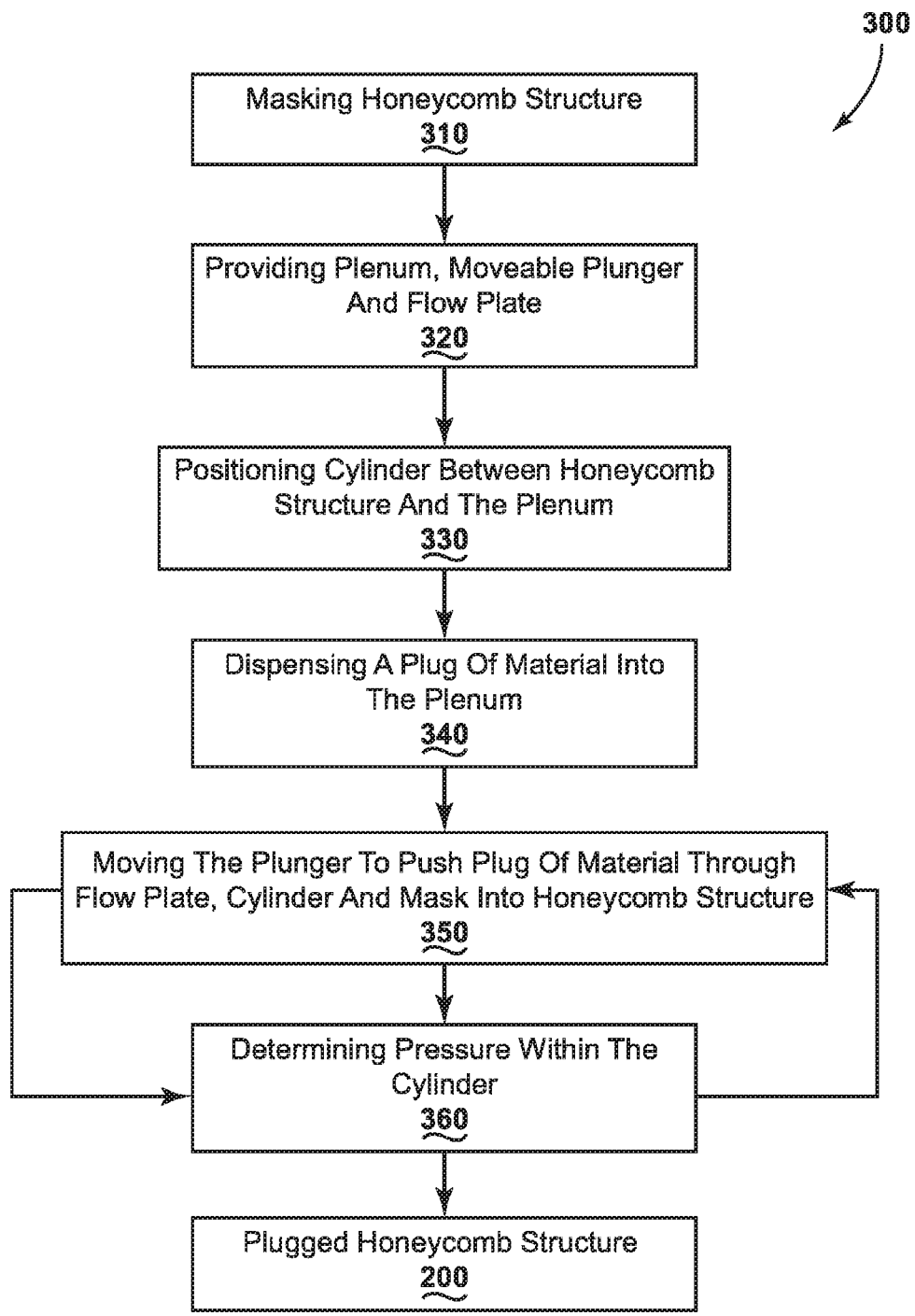
FIG. 3 is a schematic flow chart of a method for plugging a subset of cells of a honeycomb structure to form a plugged honeycomb structure.
Figure 4:
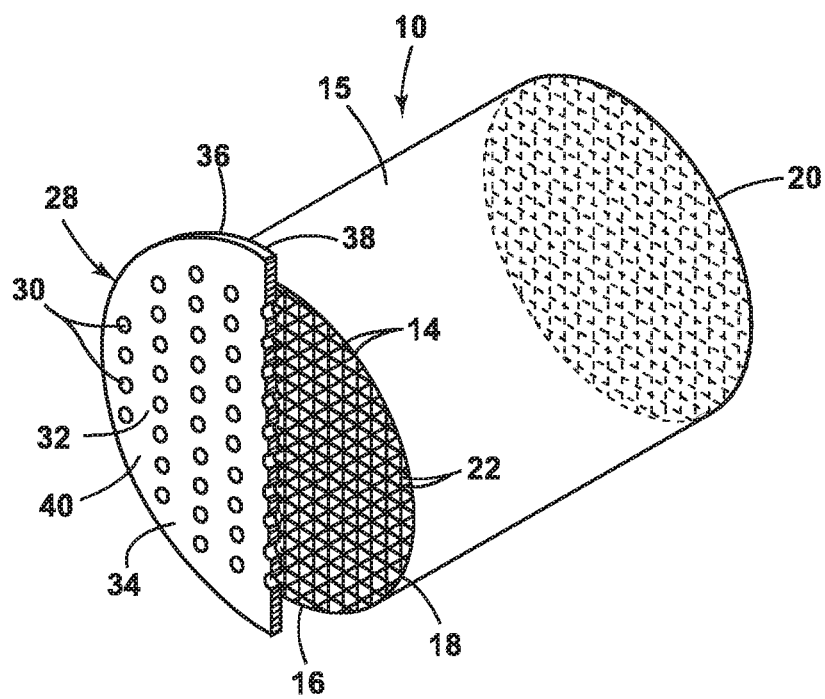
FIG. 4 is a perspective view of the first end of the extruded filter body of FIG. 2, as covered by a cross-sectioned mask.

Referring now to FIG. 3, a method 300 for plugging a subset of cells of a honeycomb structure 10 is provided. According to embodiments of the method 300, the method comprises a step 310 of masking a first end face 18 of the honeycomb structure 10 with a mask 28 that comprises a central body 32 having an outer edge 38 and a plurality of openings 30, wherein the outer edge 38 of the body 32 extends outwardly of at least a portion of an outer edge 16 of the first end face 18 of the honeycomb structure 10 and the plurality of openings 30 of the mask 28 is coincident with a plurality of cells 22 of the honeycomb structure 10 (see also FIG. 4). According to embodiments of the method 300, either the first end face 18 or the second end face 20 of the honeycomb structure 10 is covered with the mask 28 as shown in FIG. 4. In the illustrated example, the first end face 18 is covered by the mask 28 during step 310, and the mask 28 comprises an adhesive-backed, pressure-sensitive thin transparent or translucent film formed from a thermoplastic material, such as a polyester or polyethylene terephthalate (PET) material. Other materials are also suitable for the mask 28 comprising polyethylene, polypropylene, and polyurethane. Various processes can be employed to form a mask 28 of these materials, as would be understood by those of ordinary skill in the field of the disclosure. Further, the plurality of openings 30 are created through the mask 28 that correspond to the first subset 24 of the cells 22 or the second subset 26 of the cells 22 (see also FIGS. 2 and 2A). As would also be understood by those of ordinary skill in the field of the disclosure, the openings 30 can be created by any of a variety of means for opening such holes, depending on the material employed for the mask 28 (e.g., a laser tool, a stamping apparatus forming tool, a mold, etc.).

Referring again to step 310 of masking the honeycomb structure 10 (see FIGS. 3 and 4), an exemplary mask 28 comprises a central body 32 with an outer face 34 and an opposing inner face 36 with the plurality of openings 30 extending between the outer face 34 and the inner face 36. In particular, the openings 30 are positioned within the body 32 of the mask 28 so as to coincide with the ends of the first subset 24 of the cells 22 (see FIGS. 2 and 2A) (e.g., when the mask 28 is employed over the first end face 18) or the second subset 26 of the cells 22 (see FIGS. 2 and 2A) (e.g., when the mask 28 is employed over the second end face 20) to be charged with plugging material (i.e., during step 340 as outlined in more detail below). The plurality of openings 30 of the mask 28 can be suitably sized to expose the open ends of the first subset 24 or second subset 26 of the cells 22, but not so large as to expose the adjacent subset of cells 22 (i.e., subset 26 or subset 24, respectively). In some embodiments, larger openings 30 can be provided to expose several adjacent cells 22, as desired. In addition, the mask 28 comprises an outer edge 38 and an outer portion 40 that extends radially outwardly from the outer edge 16 of the first end face 18 (or the second end face 20 when the mask 28 is employed on this end). During the step 310, the body 32 of the mask 28 can be adhered to a matrix of walls 14 of the honeycomb structure 10 to hold the mask 28 in position. The mask 28, in some embodiments, can be adhered with acrylic adhesive (not shown) or any similar adhesive substance. In some implementations of the method 300, the adhesive can be applied to the mask 28 before step 310 of masking the honeycomb structure 10 is conducted.

Figure 5:
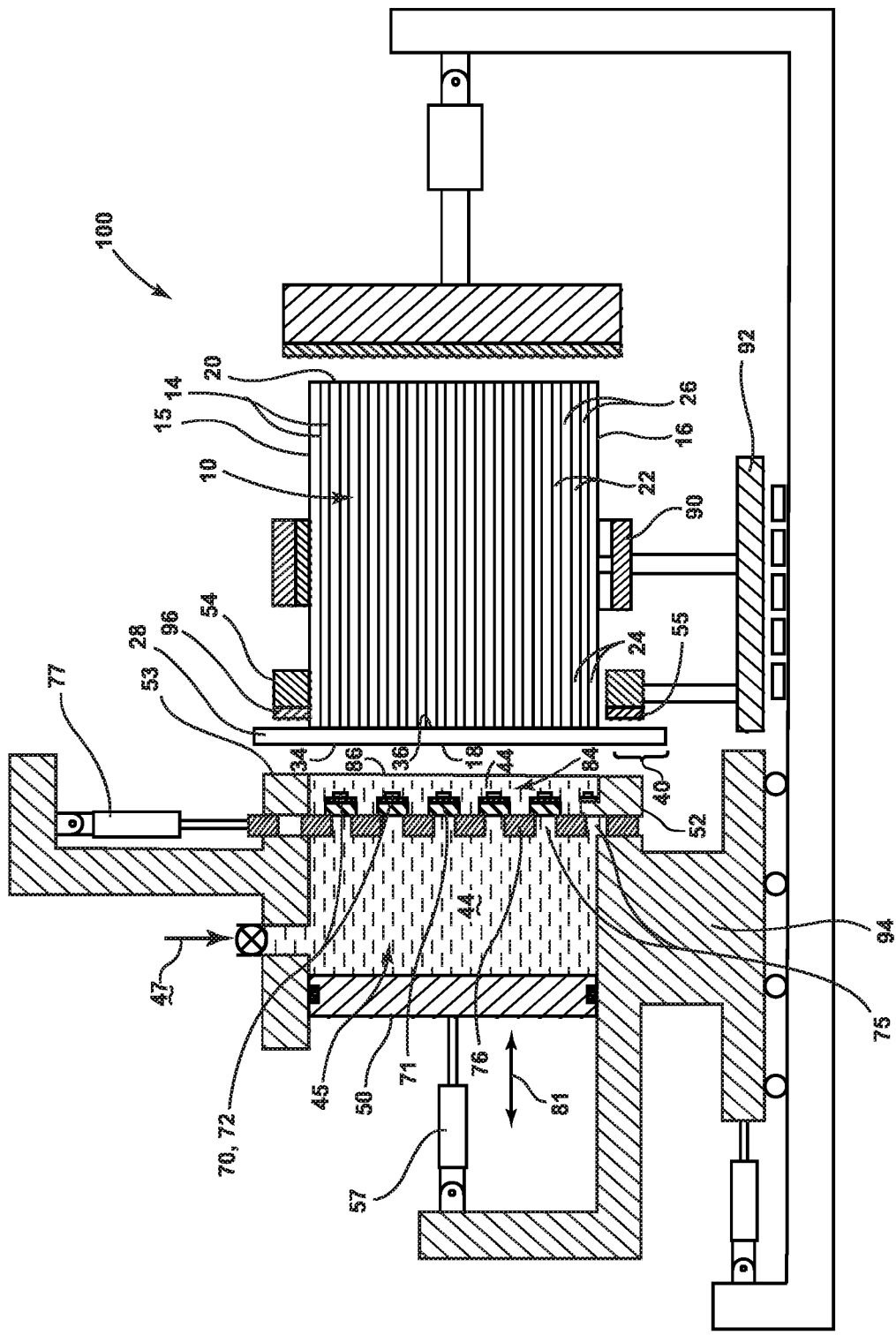
FIG. 5 is a side, cross-sectional view of the extruded filter body of FIG. 2 and a plugging apparatus with a movable plunger.

Now referring to FIGS. 3 and 5, the method 300 for plugging a subset of cells of a honeycomb structure 10, as employing a plugging apparatus 100, further comprises a step 320 of providing a plenum 45 defined by an outer edge of a movable frame 94, a movable plunger 50 and a flow plate 71, wherein the outer edge of the movable frame 94 (and plenum 45) extends to at least the outer edge 16 of the first end face 18 of the honeycomb structure 10 and the flow plate 71 comprises a plurality of flow holes 75. In embodiments, the plurality of flow holes 75 are arranged on the flow plate 71 within the plugging apparatus 100 to be substantially coincident with or otherwise proximate to one or more of the plurality of openings 30 (see FIG. 4) of the mask 28. As shown in FIG. 5, the plugging apparatus 100 is useful for fast plugging of ceramic filters, such as honeycomb structures 10. As noted earlier, the mask 28 is adhered to a first end face 18 according to step 310 of the method. Additionally, the honeycomb structure 10 could have another mask (not shown) on the second end face 20. The plugging apparatus 100 also comprises a plug of material 44, a first clamping portion 52, and a second clamping portion 54. Both clamping portions 52, 54 cooperate to clamp an outer portion 40 of the mask 28 in a releasable fashion.

In an additional embodiment, step 320 can be conducted such that the plugging apparatus 100 positions the honeycomb structure 10 prior to the plugging-related steps. In particular, positioner 90 can be employed to position the structure 10 in the vertical and lateral directions. Positioner 90 can be affixed to a movable frame 92 that extends and retracts (into and out of the plane of the apparatus 100 depicted in FIG. 5). Alternatively, the positioner 90 may be preset in a stationary position, such that a honeycomb structure 10 is placed on the positioner 90 and is then in the correct location for subsequent plugging-related steps.

Referring again to FIGS. 3 and 5, the plugging apparatus 100 that can be employed according to the method 300 for plugging a subset of cells of a honeycomb structure 10 comprises a mask 28, as situated on the structure, e.g., according to step 310. The outer portion 40 of the mask 28 can extend radially outward from the outer edge 16 of the honeycomb structure 10. Mask 28, as noted earlier, can extend radially outward from the outer edge 16 when a portion of the mask 28, while placed on, or otherwise adhered to, the structure 10, extends radially beyond the outer edge 16. In an embodiment, the mask 28 extends about 0.1 inches (0.254 cm) to about 1 inch (2.54 cm) past the outer edge 16 of the honeycomb structure 10. In some instances, the mask 28 can extend to greater than 1 inch to any distance sufficient to allow secure clamping of the outer portion 40 of the honeycomb structure 10.

Referring again to FIGS. 3 and 5, the method 300 for plugging a subset of cells of a honeycomb structure 10, as employing plugging apparatus 100, further comprises a step 330 of positioning a cylinder 84 between the honeycomb structure 10 and the plenum 45. Further, the cylinder 84 is defined by an outer edge (e.g., an inner edge of the first clamping portion 52), the flow plate 71 and the mask 28, wherein the outer edge of the cylinder 84 extends to at least the outer edge 16 of the first end face 18 of the honeycomb structure 10. Within the plugging apparatus 100, the volume of the plug of material 44 is contained within the cylinder 84. The cylinder 84 generally has a cross-sectional shape that approximates the shape of the first end face 18 of the structure 10, for example, round or oval. Further, the cylinder 84 contains a volume of the plug of material 44, at least a portion of which becomes the plug 62 in the honeycomb structure 10 (see FIG. 5A).

In an embodiment, the cylinder 84 has a depth of from about 0.1 inches (0.254 cm) to about 2 inches (5.08 cm), from about 0.1 inches to about 1 inch (2.54 cm), or from about 0.25 inches (0.635 cm) to about 0.75 inches (1.905 cm). Alternatively, the cylinder 84 can have any depth that is large enough to insure a sufficient amount of the plug of material 44 to flow such that the entire cross-sectional area is filled. Also, the cylinder 84 should be small enough to minimize slumping of the plug of material 44 if the honeycomb structure 10 is plugged in a horizontal orientation. Slumping occurs due to the liquid nature of the plug of material 44. When the plugging apparatus 100 is opened while loading a new structure 10, there is nothing holding the plug of material 44 in the cylinder 84. Therefore, given enough time the plug of material 44 will begin to flow out of the cylinder 84 and cause a slump in the surface 86 of the plug of material 44 in the cylinder 84. Thus, it should be apparent that the mask 28 of the next honeycomb structure 10 to be plugged should be quickly sealed between clamping portions 52, 54 shortly after removing the prior-plugged honeycomb structure 10.

Referring again to FIGS. 3 and 5, the method 300 for plugging a subset of cells of a honeycomb structure 10, as employing a plugging apparatus 100, further comprises a step 340 of dispensing a plug of material 44 into the plenum 45. In embodiments, the plenum 45 can be filled with a plug of material 44 during step 340 through a pressurized supply 47 connected to the plenum 45. A valve associated with the pressurized supply 47 can be opened to allow the plug of material 44 to flow into the plenum 45, e.g., when the plunger 50 is in a retracted position that does not block the valve and opening of the supply 47. As readily understood by those of ordinary skill in the field of the disclosure, other approaches and configurations of the plugging apparatus 100 can be envisioned to dispense the plug of material 44 into the plenum 45 during step 340.

Referring again to FIGS. 3 and 5, the method 300 for plugging a subset of cells of a honeycomb structure 10, as employing plugging apparatus 100, further comprises a step 350 of moving a plunger 50 toward the flow plate 71 with a force (in the direction of arrow 81) to push the plug of material 44 through the plurality of flow holes 75 of the flow plate 71 into the cylinder 84. The plenum 45, as containing a plug of material 44 by virtue of step 340, is connected with the cylinder 84. In operation, the plunger 50 causes the plug of material 44 in the plenum 45 to pass through aligned flow holes 75 (also referred to as "passages" in the disclosure) (see FIG. 5A) in a flow control member 74. The movement of the plunger 50 transfers the plug of material 44 to re-fill the cylinder 84. The plug of material 44 forced into cylinder 84, at the same time, forces approximately the same amount of the plug of material 44 out of the cylinder 84 to fill the selected channels of the honeycomb structure 10 to the desired plug depth. The plunger 50 moves in the direction of arrow 81, for example, by an actuator 57 mounted between the plunger 50 and a moveable frame 94.

Still referring to FIGS. 3 and 5, step 350 of the method 300 for plugging a subset of cells of a honeycomb structure 10, as employing a plugging apparatus 100, is further conducted such that moving the plunger 50 generates a pressure in the plenum 45 and cylinder 84 that forces the plug of material 44 through the plurality of openings 30 of the mask 28 and into the plurality of cells 22 of the honeycomb structure 10 to form a plurality of plugs 62 to a predetermined depth 62a (see also FIG. 5A) within the cells 22. In embodiments, the flow control member 74 can be opened and the plunger 50 can move toward the honeycomb structure 10. Once the plunger 50 has begun forcing the plug of material 44 into the structure 10, the plunger 50 does not stop until the plurality of plugs 62 have reached the desired predetermined depth 62a. This approach, according to the method 300, can aid in forming the plurality of plugs 62 to a uniform, predetermined depth 62a. According to embodiments of the plugging apparatus 100, the flow of the plug of material 44 between the plenum 45 and the cylinder 84 can be controlled by aligning and misaligning the passages 75a and 75b of the flow control member 74 (see FIG. 5A). In an embodiment, the flow control member 74 comprises a moveable member 76 such as a moveable shutter plate, and a stationary flow plate 71, preferably the wall of the cylinder 84. To allow flow of the plug of material 44 through the flow control member 74, the moveable member 76 is moved to a first position (FIG. 5A), where the passages 75a are substantially aligned with the like passages 75b formed in the wall of the cylinder 84.

Figure 5A:
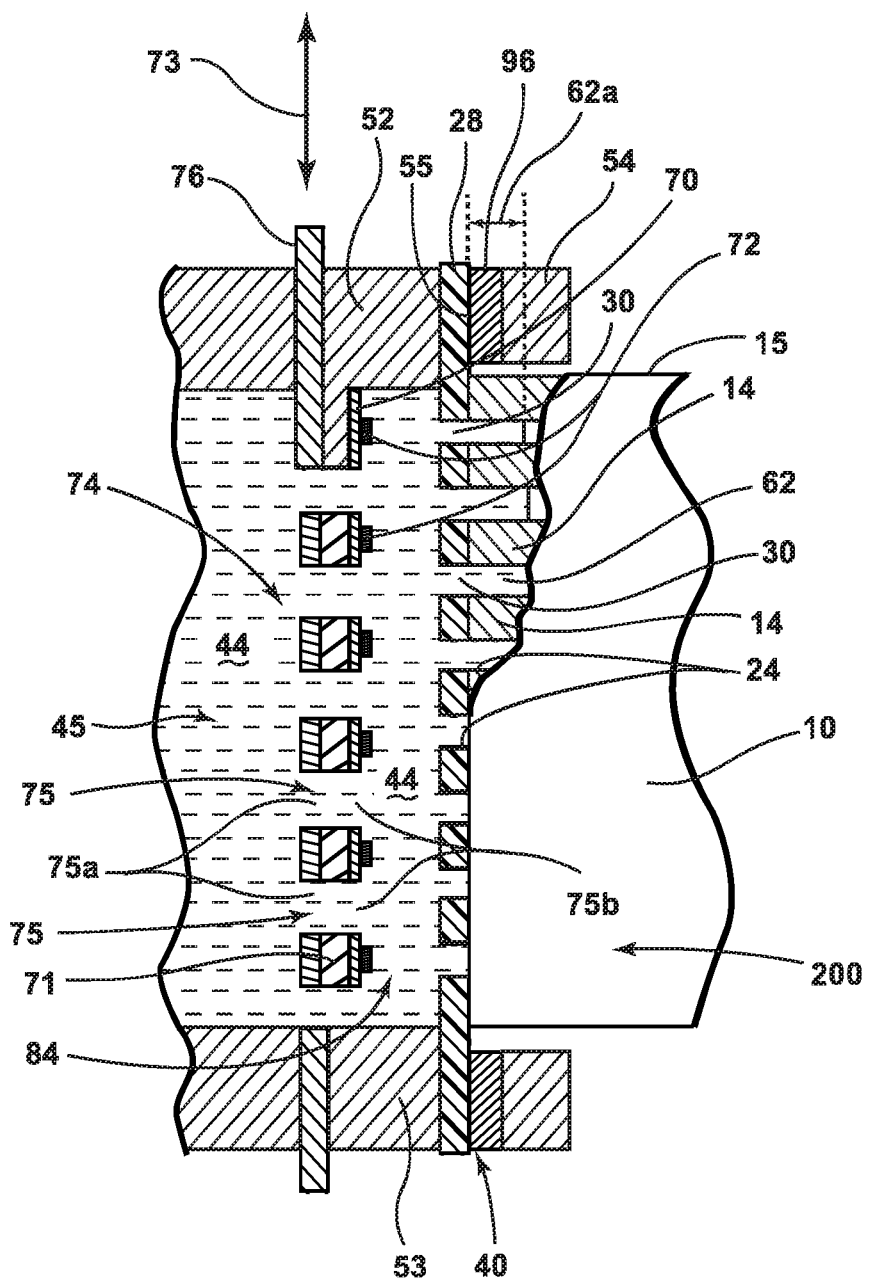
FIG. 5A is an enlarged view of a portion of the extruded filter body and plugging apparatus depicted in FIG. 5, as configured with a closed cylinder during movement of the plunger in the plenum.

Referring to the passages 75a, 75b depicted in FIG. 5A, in an embodiment, the passages 75a, 75b formed in the moveable member 76 and flow plate 71 are circular in shape. The passages 75a, 75b are preferably equally spaced, from about 0.2 cm to about 2 cm apart. In embodiments, the passages 75a, 75b have a diameter from about 0.1 cm to about 1.5 cm. Alternatively, the passages 75a, 75b can be of any size, shape, or spatial proximity to allow or otherwise facilitate the flow of the plug of material 44 through the plenum 45 and cylinder 84, yet still allow sufficient shut off of the flow of the plug of material 44 when misaligned. In an embodiment, the passages 75a, 75b in the moveable member 76 and flow plate 71 members cover approximately 25 percent of the possible surface of the members, where 100 percent coverage equates to no blocking at all of the plug of material 44 during plugging. In one embodiment, the passages 75a of the moveable member 76 are substantially similar to the passages 75b in the flow plate 71, to allow smooth transition of the plug of material 44 from the plenum 45 to the cylinder 84.

Referring again to the plugging apparatus 100 and method 300 for plugging a subset of cells of a honeycomb structure shown in FIGS. 3, 5 and 5A, steps 340 and/or step 350 can be further conducted to manage the flow of the plug of the material 44. In embodiments of the method 300 and apparatus 100, to halt the transfer of the plug of material 44 into the cylinder 84, the moveable member 76 can be moved to a second position where the passages 75a of the moveable member 76 and the passages 75b in the flow plate 71 are misaligned (FIG. 5A). In an embodiment, the moveable member 76 is linearly moveable in the direction of arrow 73 (FIG. 5A) and moves with the aid of an actuator 77. In one embodiment, the moveable member 76 moves less than 0.5 inches (1.27 cm) and takes less than 1 second to complete the shut off of the flow of the plug of material 44. After the purposeful misaligning of the passages 75a, 75b between the moveable member 76 and the flow plate 71, plenum 45 can be refilled with the plug of material 44.

Referring once again to the plugging apparatus 100 and method 300 for plugging a subset of cells of a honeycomb structure shown in FIGS. 3, 5 and 5A, steps 340 and/or step 350 can be further conducted to aid in the production of multiple plugged honeycomb structures 200 from honeycomb structures 10. In an embodiment, once the plunger 50 has forced a desired portion of the plug of material 44 to a desired predetermined depth 62a in a honeycomb structure 10, the plunger 50 stops and can be retracted slightly to allow the pressure built up during the plugging method 300 to be relieved. The plunger 50 itself, in some embodiments, can possess a sensor (not shown) that measures the force against the plunger 50 by the plug of material 44 as it is being retracted. Once the force of the plug of material 44 against the plunger 50 reaches zero or lower, the motion of the plunger 50 can be arrested. At this point, the pressure in the plenum 45 and cylinder 84 has been relieved and the moveable member 76 can be actuated to close (misalign) the passages 75a, 75b between the plenum 45 and cylinder 84.

Once the moveable member 76 has closed the passages 75a, 75b, the honeycomb structure 10, now in the form of plugged honeycomb structure 200 (see FIG. 3), can be removed from the plugging apparatus 100. In particular, the plugged honeycomb structure 200 can be removed from the cylinder 84 (e.g., by removing the clamping portions 52 and 54) and then a new (unplugged) honeycomb structure 10 can be installed in the cylinder 84. At this point, the flow control member 74 can be closed, and the plenum 45 can be refilled with a new plug of material 44, as described earlier (e.g., by action of the pressurized supply 47).

Once again referring to FIGS. 3, 5 and 5A, the method 300 for plugging a subset of cells of a honeycomb structure 10, as employing the plugging apparatus 100, further comprises a step 360 of determining the pressure within the cylinder 84 during the step 350 of moving the plunger 50. In embodiments, the length of the cylinder 84 between the flow plate 71 and the mask 28, e.g., as defined by the thickness of the first clamping portion 52, can be controlled to ensure that the pressure in the cylinder 84 can be accurately correlated to the pressure within the plurality of cells 22 during step 350. That is, a pressure can be measured as part of step 360 within the cylinder 84 during the step 350 of moving the plunger 50 to push the plug of material 44 through the plurality of openings 30 of the mask 28 and into the plurality of cells 22, and this pressure in the cylinder 84 can be correlated to a pressure of the plug of material 44 as it fills in the cells 22 to form a plurality of plugs 62. As such, step 360 can be employed to monitor the pressure in the cylinder 84 as the plug of material 44 is introduced into the cells 22.

According to an embodiment of the method 300, as employing plugging apparatus 100 (see FIGS. 3, 5 and 5A), the step 350 of moving the plunger 50 can further comprise adjusting the force applied to the plunger 50 to push the plug of material 44 therein based at least in part on the pressure measured in the cylinder 84 during step 360. Advantageously, the pressure measured during step 360 can be employed by the method 300 to control, adjust or otherwise monitor step 350 as the plug of material 44 is introduced into the honeycomb structure 10 to improve the uniformity of the depth 62a of the plurality of plugs 62 formed in the structure 10. For example, variances in the pressure measured in the cylinder 84 during step 360 relative to a predetermined pressure value can be used to adjust the force applied to the plunger 50 to ensure that a repeatable predetermined depth 62a is obtained in the production of multiple plugged honeycomb structures 200 made according to the method 300. In other implementations of the method 300 depicted in FIG. 3, the pressure data obtained during step 360 can be evaluated to calculate or otherwise set a target pressure for the plurality of cells 22 for purposes of conducting the step 350 of moving the plunger 50. According to some implementations, the target pressure is a lower bound pressure that is set to ensure that the predetermined depth 62a of the plug of material 44 within each of the plurality of plugs 62 is at a minimum depth within the cells 22 (see FIG. 5A) of the honeycomb structure 10. In some embodiments, the target pressure further comprises an upper bound pressure that is also set to ensure that the predetermined depth 62a of the plug of material 44 within each of the plurality of plugs 62 remains below a maximum depth within the cells 22 (see FIG. 5A) of the honeycomb structure 10.

Figure 5B:
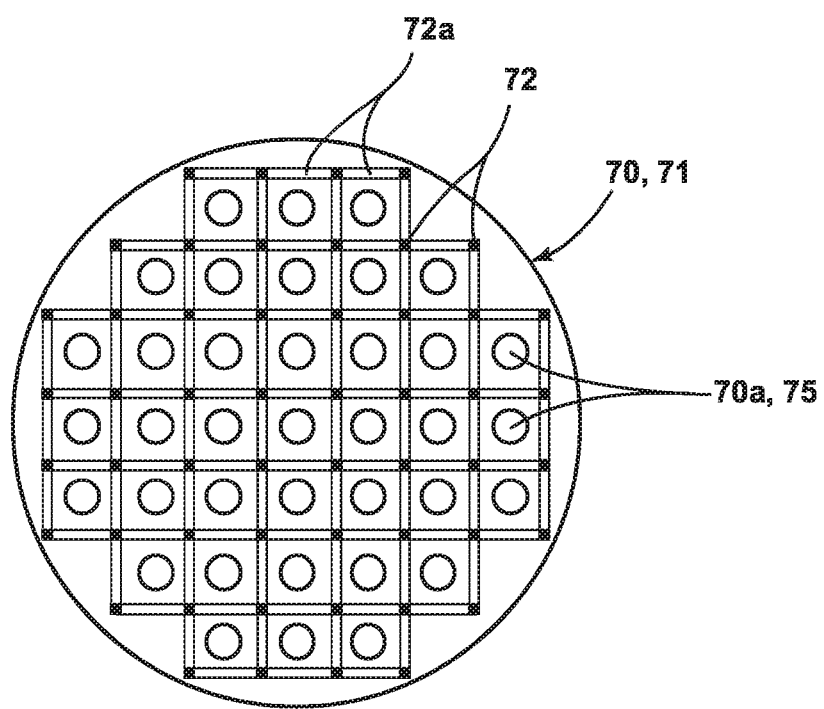
FIG. 5B is a top, plan view of a flow plate and pressure sensor film with a plurality of pressure sensors, as employed in the plugging apparatus depicted in FIG. 5.

In embodiments of the method 300 (see FIGS. 3, 5 and 5A), as employing plugging apparatus 100, step 360 can be conducted such that output data from a pressure sensor film 70 is evaluated (see also FIG. 5B). In some embodiments, the pressure sensor film 70 can be disposed in the cylinder 84 on the flow plate 71, as depicted in FIGS. 5, 5A and 5B. In other embodiments, the pressure sensor film 70 is disposed within the cylinder 84 between the flow plate 71 and the mask 28 (e.g., on the mask 28 or at a position between the mask 28 and the flow plate 71). According to another implementation, the pressure film 70 is disposed within the plenum 45, e.g., on a face of the flow plate 71 within the plenum 45, or on the moveable member 76 for embodiments having a flow control member 74 that comprises the moveable member 76. Further, in embodiments, the pressure sensor film 70 can comprise a plurality of pressure sensors 72 (e.g., a sensor film as supplied by Tekscan™, Inc.) and a plurality of holes 70a, each of the holes 70a configured to coincide with the plurality of flow holes 75 in the flow plate 71. The sensors 72 can be configured to be proximate to one or more of the flow holes 75 of the flow plate 71. In embodiments, the sensors 72 can be equally dispersed across the face of the pressure sensor film 70. In a preferred embodiment, the plurality of sensors 72 are dispersed in a matrix 72a such that at least four sensors surround each of the flow holes 75 of the flow plate 71 (and holes 70a of the sensor film 70). Further, the matrix 72a can comprise interconnections to electrically connect the sensors 72 to a control module (not shown). The control module can be part of a computer used to evaluate output data from the sensors 72 of the pressure sensor film 70. According to some implementations of the method 300, step 360 can be conducted such that the pressure measured in the cylinder 84 is a plurality of region pressures, with each region corresponding to a portion of the plurality of cells 22.

Referring again to the method 300, as employing plugging apparatus 100, step 360 can be conducted such that multiple pressures are measured within the honeycomb structure 10 (e.g., by virtue of a pressure sensor film 70 comprising a plurality of pressure sensors 72) that correspond to particular groups or regions of cells 22 at different locations on the first end face 18 (or second end face 20, as shown in FIGS. 1 and 2). In some implementations, the pressure data associated with these groups or regions of cells 22 can be employed by the method 300 to adjust the plunger 50 to apply a more uniform force to the plug of material 44 during step 350 to account for the varying pressure data. In additional implementations of the method 300 depicted in FIG. 3, the pressure data obtained during step 360 associated with a plurality of pressure sensors 72 can be evaluated to calculate or otherwise set a target pressure for the plurality of cells 22 for purposes of conducting the step 350 of moving the plunger 50, e.g., based on an average of the pressure data associated with the plurality of pressure sensors 72. According to some implementations, the target pressure is a lower bound pressure that is set to ensure that the predetermined depth 62a of the plug of material 44 within each of the plurality of plugs 62 is at a minimum depth within the cells 22 (see FIG. 5A) of the honeycomb structure 10. In some embodiments, the target pressure further comprises an upper bound pressure that is also set to ensure that the predetermined depth 62a of the plug of material 44 within each of the plurality of plugs 62 remains below a maximum depth within the cells 22 (see FIG. 5A) of the honeycomb structure 10. In another implementation, this pressure data can also be employed to create a pressure map of the first end face 18 or second end face 20 of the honeycomb structure 10 that plots the multiple pressures measured as a function of location or region of portions of the cells 22. In addition, the method 300 can be conducted such that step 340 further comprises providing the plug of material 44 at a non-uniform thickness within the plenum 45 based at least in part on prior-measured output pressure data obtained from the step 360 (e.g., as obtained from a different honeycomb structure fabricated according to the method 300), as employing a pressure sensor film 70 with a plurality of pressure sensors 72.

Referring again to FIG. 5, in an implementation of the plugging apparatus 100, the first clamping portion 52 comprises a first surface 53 positioned about and surrounding an outer portion of the cylinder 84. Likewise, the second clamping portion 54 comprises a second surface 55, the second surface 55 preferably being generally opposite, and parallel to, the first surface 53. In one embodiment, the second clamping portion 54 comprises a compliant face 96 of elastomer or polymer material, preferably polyurethane, that is deformed to improve a seal while clamping the mask 28. To clamp the mask 28, the first surface 53 is brought into contact with the outer portion 40 of the mask 28. The second surface 55 is likewise brought into contact with the outer portion 40 of the mask 28. The surfaces compress the mask 28 with sufficient force to seal the cylinder 84 such that the plug of material 44 is hindered from leaking out onto the sides of the honeycomb structure 10, or out between the surface 53 and the mask 28, during a step of transferring the plug of material 44. Of course, the first surface 53 and second surface 55 need not be planar or parallel, and any configuration that accomplishes sealing may be employed Referring to FIGS. 3, 5 and 5A, the method 300 can be conducted, as employing the plugging apparatus 100, upon completion of steps 310-360 to produce a plugged honeycomb structure 200, e.g., with a plurality of plugs 62 as located within a first subset 24 and a second subset 26 of cells 22. At this point, the plugged honeycomb structure 200 can be removed from within the plugging apparatus 100, as described earlier. According to embodiments of the method 300, the honeycomb structure 10 can be positioned in various orientations within the plugging apparatus 100, particularly with first end face 18 facing the plunger 50 (as shown in FIG. 5) or the second end face 20 facing the plunger 50 (not shown).

Figure 6:
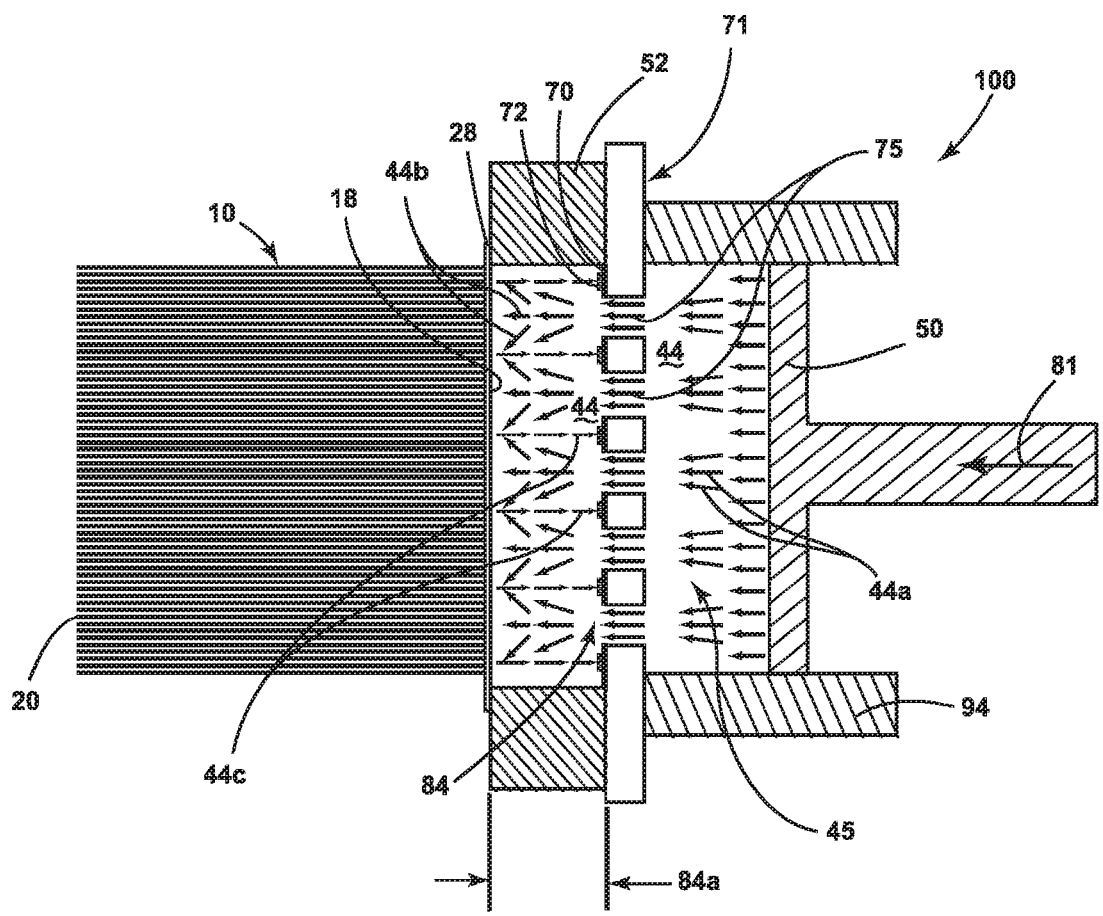
FIG. 6 is a side, cross-sectional schematic view of the plugging apparatus depicted in FIG. 5, as depicting flow of plugging material and pressure within the cylinder and plenum of the plugging apparatus.
Figure 6A:
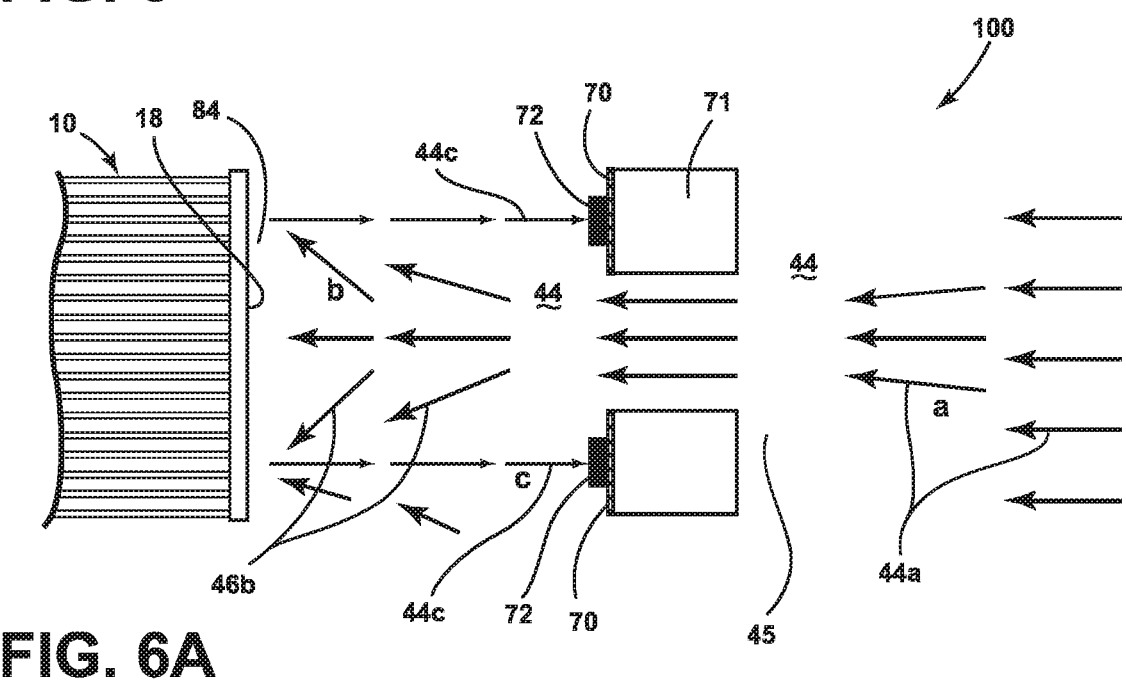
FIG. 6A is an enlarged view of a portion of the extruded filter body and plugging apparatus depicted in FIG. 6.

Referring now to FIGS. 6 and 6A, a side, cross-sectional schematic view of the plugging apparatus 100 is shown. In particular, the schematic in FIG. 6 depicts the flow and pressure of the plug of material 44 in the plenum 45 and cylinder 84 during step 350 of the method 300 for plugging a subset of cells of a honeycomb structure 10 (see FIG. 3). As the plunger 50 is moved in the direction of arrow 81 within the moveable frame 94, the plug of material 44 is pushed from the plenum 45 (at position "a" shown in FIG. 6A) in the direction of arrows 44a through the plurality of holes 75 of the flow plate 71 and the holes 70a of the pressure sensor film 70 (see FIG. 5B). As the plug of material 44 passes from the plenum 45 through the plurality of holes 75 of the flow plate 71, it enters the cylinder 84. The plug of material 44 continues to flow and spread within the cylinder 84 in the direction of arrows 44b and contacts the mask 28 (at position "b" shown in FIG. 6A). The plug of material 44 is then pressured through the plurality of openings 30 into the first end face 18 of the honeycomb structure 10 (or second end face 20 for an opposite orientation of the structure 10 within the apparatus 100), eventually forming a plurality of plugs 62 within the cells 22 and defining a plugged honeycomb structure 200 (see FIGS. 3 and 5). Though the plug of material 44 does not flow backward toward the plunger 50, a relatively high amount of backward pressure develops in the cylinder 84 from the plug of material 44 in proximity to the mask 28 and toward the flow plate 71, as denoted by arrows 44c (and position "c" shown in FIG. 6A).

Referring again to FIGS. 6 and 6A, it is evident that the backward pressure of the plug of material 44 in the cylinder 84, as denoted by arrows 44c, can advantageously be used as a proxy for the pressure of the plug of material 44 within the cells 22 (see FIGS. 1, 2 and 4) of the honeycomb structure 10. While the backward pressure develops a pressure gradient that decreases as a function of distance from the mask 28 toward the flow plate 71, the length 84a in the cylinder 84 can be set such that the backward pressure distribution of the plug of material 44 in the cylinder 84 can be measured by the pressure sensors 72 affixed to the pressure sensor film 70. The pressure gradient within the cylinder 84 is such that the pressure of the plug of material 44 at the flow plate 71 can be accurately measured (e.g., by the pressure sensors 72 of the pressure sensor film 70), given the relatively short length 84a configured for the cylinder 84. In some embodiments, the length 84a of the cylinder 84 can be set from about 2 mm to about 100 mm, from about 5 mm to about 50 mm, from about 10 mm to about 25 mm, and all lengths 84a between these amounts. In a preferred embodiment, the length 84a of the cylinder 84 is set at 4 mm, 6 mm, 8 mm, 10 mm, 12 mm, 14 mm, 16 mm, 18 mm, 20 mm, 22 mm, 24 mm, 26 mm, 28 mm, 30 mm, or any other length between these values. As such, step 360 of the method 300 for plugging a subset of cells of a honeycomb structure 10 can be conducted to obtain an accurate measurement of the backward pressure of the plug of material 44 at the flow plate 71, which can be correlated to the pressure within the cells 22 of the honeycomb structure 10. With such information, step 350 of moving the plunger 50 can be calibrated, adjusted or otherwise controlled to improve the uniformity of the plurality of plugs 62 developed in the plugged honeycomb structure 200. With improved uniformity in the plurality of plugs 62, the method 300 can advantageously be employed to improve the uniformity of the predetermined depth 62a of the plurality of plugs 62 in the plugged honeycomb structure 200, which can be manifested in improved process yield, cost and/or end product performance.

While exemplary embodiments and examples have been set forth for the purpose of illustration, the foregoing description is not intended in any way to limit the scope of the disclosure and appended claims. Accordingly, variations and modifications may be made to the above-described embodiments and examples without departing substantially from the spirit and various principles of the disclosure. All such modifications and variations are intended to be included herein within the scope of this disclosure and protected by the following claims.

What is claimed is:

1. A method for plugging a subset of cells of a honeycomb structure, comprising:
   covering a first end face of the honeycomb structure with a mask that comprises a body having an outer edge and a plurality of openings, wherein the outer edge of the body extends outwardly to at least a portion of an outer edge of the first end face and the plurality of openings of the mask is coincident with a plurality of cells of the honeycomb structure;
   providing a plenum defined by an outer edge, a movable plunger and a flow plate, wherein the outer edge of the plenum extends to at least the outer edge of the first end face of the honeycomb structure and the flow plate comprises a plurality of flow holes;
   positioning a cylinder between the honeycomb structure and the plenum, the cylinder defined by an outer edge, the flow plate and the mask, wherein the outer edge of the cylinder extends to at least the outer edge of the first end face of the honeycomb structure;
   dispensing plugging material into the plenum;
   moving the plunger toward the flow plate with a force to push the plugging material through the plurality of flow holes of the flow plate into the cylinder, wherein the step of moving the plunger generates a pressure in the plenum and the cylinder that forces the plugging material through the plurality of openings of the mask and into the plurality of cells of the honeycomb structure to a predetermined depth within the cells; and
   determining the pressure within the cylinder during the step of moving the plunger.

2. The method of claim 1, wherein the mask comprises a polymer material.

3. The method of claim 1, wherein the step of dispensing plugging material into the plenum is conducted by pumping the plugging material into the plenum.

4. The method of claim 3, wherein the step of dispensing plugging material into the plenum is further conducted by closing a shutter in the plenum during the pumping of the plugging material, and further wherein the step of moving the plunger toward the flow plate further comprises opening the shutter in the plenum.

5. The method of claim 1, further comprising:
   adjusting the force to push the plugging material through the plurality of flow holes of the flow plate into the cylinder based at least in part on the pressure within the cylinder.

6. The method of claim 1, wherein the step of determining the pressure within the cylinder further comprises determining a pressure in the plurality of cells of the honeycomb structure based at least in part on the pressure in the cylinder.

7. The method of claim 1, wherein each of the holes of the flow plate is proximate to at least one of the openings of the mask.

8. The method of claim 5, wherein the step of determining the pressure within the cylinder comprises calculating a target pressure within the cylinder, and further wherein the step of adjusting the force to push the plugging material is conducted such that the force to push the plugging material through the plurality of flow holes of the flow plate into the cylinder is based at least in part on the target pressure, the target pressure comprising a lower bound pressure and an upper bound pressure within the cylinder.

9. A method for plugging a subset of cells of a honeycomb structure, comprising:
   covering a first end face of the honeycomb structure with a mask that comprises a body having an outer edge and a plurality of openings, wherein the outer edge of the body extends outwardly to at least a portion of an outer edge of the first end face and the plurality of openings of the mask is coincident with a plurality of cells of the honeycomb structure;
   providing a plenum defined by an outer edge, a movable plunger and a flow plate, wherein the outer edge of the plenum extends to at least the outer edge of the first end face of the honeycomb structure and the flow plate comprises a plurality of flow holes;
   positioning a cylinder between the honeycomb structure and the plenum, the cylinder defined by an outer edge, the flow plate and the mask, wherein the outer edge of the cylinder extends to at least the outer edge of the first end face of the honeycomb structure;

dispensing a plugging material into the plenum;

moving the plunger toward the flow plate with a force to push the plugging material through the plurality of flow holes of the flow plate into the cylinder, wherein the step of moving the plunger generates a pressure in the plenum and the cylinder that forces the plugging material through the plurality of openings of the mask and into the plurality of cells of the honeycomb structure to a predetermined depth within the cells; and determining the pressure within the cylinder during the step of moving the plunger, wherein the step of determining the pressure within the cylinder is conducted by evaluating output data from a pressure sensor film disposed between the flow plate and the mask.

10. The method of claim 9, wherein the pressure sensor film is disposed on the flow plate within the plenum.

11. The method of claim 9, wherein the step of dispensing a plugging material in the plenum is conducted by pumping the plugging material into the plenum.

12. The method of claim 11, wherein the step of dispensing a plugging material into the plenum is further conducted by closing a shutter in the plenum during the pumping of the plugging material, and further wherein the step of moving the plunger toward the flow plate further comprises opening the shutter in the plenum.

13. The method of claim 9, further comprising:
adjusting the force to push the plugging material through the plurality of flow holes of the flow plate into the cylinder based at least in part on the pressure within the cylinder.

14. The method of claim 9, wherein each of the holes of the flow plate is proximate to at least one of the openings of the mask, and wherein the pressure sensor film comprises a plurality of holes configured to coincide with the holes of the flow plate.

15. The method of claim 13, wherein the step of determining the pressure within the cylinder comprises calculating a target pressure within the cylinder, and further wherein the step of adjusting the force to push the plugging material is conducted such that the force to push the plugging material through the plurality of flow holes of the flow plate into the cylinder is based at least in part on the target pressure, the target pressure comprising a lower bound pressure and an upper bound pressure within the cylinder.

16. A method for plugging a subset of cells of a honeycomb structure, comprising:
covering a first end face of the honeycomb structure with a mask that comprises a body having an outer edge and a plurality of openings, wherein the outer edge of the body extends outwardly to at least a portion of an outer edge of the first end face and the plurality of openings of the mask is coincident with a plurality of cells of the honeycomb structure;

providing a plenum defined by an outer edge, a movable plunger and a flow plate, wherein the outer edge of the plenum extends to at least the outer edge of the first end face of the honeycomb structure and the flow plate comprises a plurality of flow holes;

positioning a cylinder between the honeycomb structure and the plenum, the cylinder defined by an outer edge, the flow plate and the mask, wherein the outer edge of the cylinder extends to at least the outer edge of the first end face of the honeycomb structure;

dispensing a plugging material in the plenum;

moving the plunger toward the flow plate with a force to push the plugging material through the plurality of flow holes of the flow plate into the cylinder, wherein the step of moving the plunger generates a pressure in the plenum and the cylinder that forces the plugging material through the plurality of openings of the mask and into the plurality of cells of the honeycomb structure to a predetermined depth within the cells; and determining a plurality of pressures within the cylinder during the step of moving the plunger, each of the pressures associated with one or more of the cells of the honeycomb structure, wherein the step of determining the plurality of pressures is conducted by evaluating output data from a pressure sensor film disposed between the flow plate and the mask, and further wherein the sensor film comprises a plurality of pressure sensors.

17. The method of claim 16, wherein the pressure sensor film is disposed on the flow plate within the plenum.

18. The method of claim 16, wherein the step of dispensing a plugging material in the plenum is conducted by pumping the plugging material into the plenum.

19. The method of claim 18, wherein the step of dispensing a plugging material in the plenum is further conducted by closing a shutter in the plenum during the pumping of the plugging material, and further wherein the step of moving the plunger toward the flow plate further comprises opening the shutter in the plenum.

20. The method of claim 16, further comprising:
adjusting the force to push the plugging material through the plurality of flow holes of the flow plate into the cylinder based at least in part on the plurality of pressures within the cylinder.

21. The method of claim 16, wherein each of the holes of the flow plate is proximate to at least one of the openings of the mask.

22. The method of claim 16, wherein the pressure sensor film comprises a plurality of holes configured to coincide with the holes of the flow plate and each of the plurality of pressure sensors is proximate to one or more of the flow holes of the flow plate.

23. The method of claim 20, wherein the step of determining the plurality of pressures within the cylinder comprises calculating a target pressure within the cylinder, and further wherein the step of adjusting the force to push the plugging material is conducted such that the force to push the plugging material through the plurality of flow holes of the flow plate into the cylinder is based at least in part on the target pressure, the target pressure comprising a lower bound pressure and an upper bound pressure within the cylinder.

* * * * *